Figure 1:
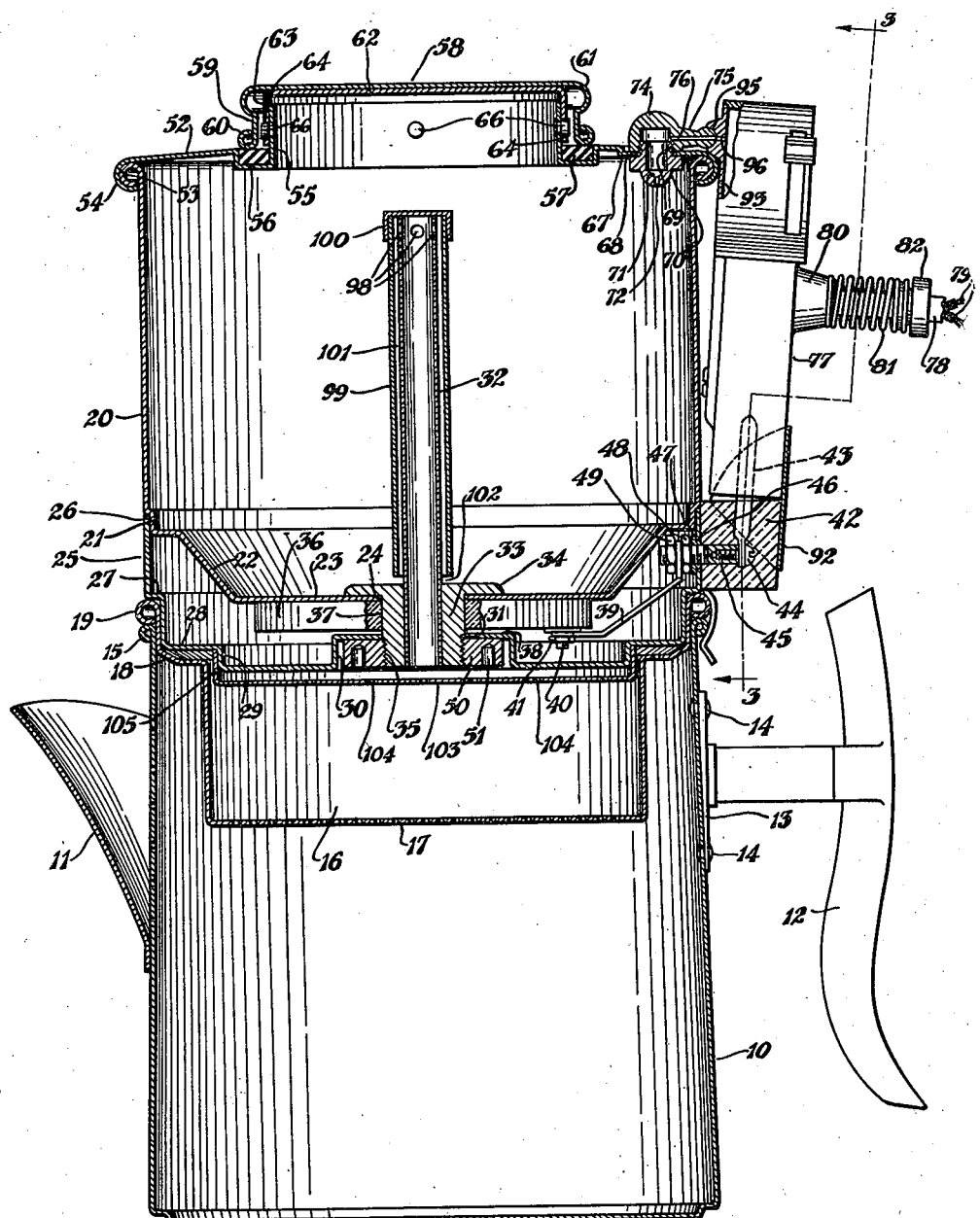

Feb. 12, 1935.  A. C. WILCOX  1,990,508
AUTOMATIC ELECTRIC DRIP COFFEE MAKER
Filed Sept. 19, 1933    2 Sheets-Sheet 1

Inventor
A. C. Wilcox
By Frease and Bishop
Attorneys

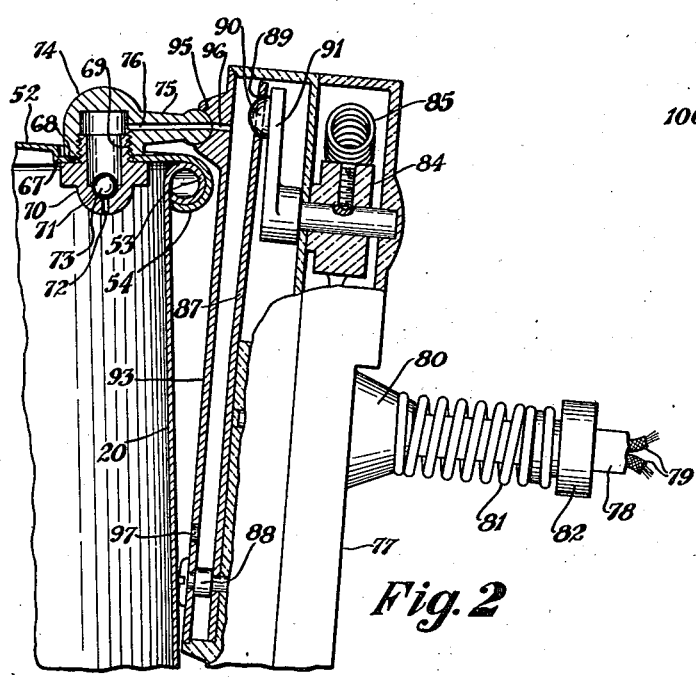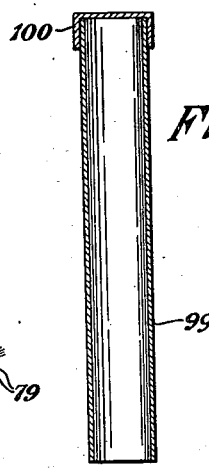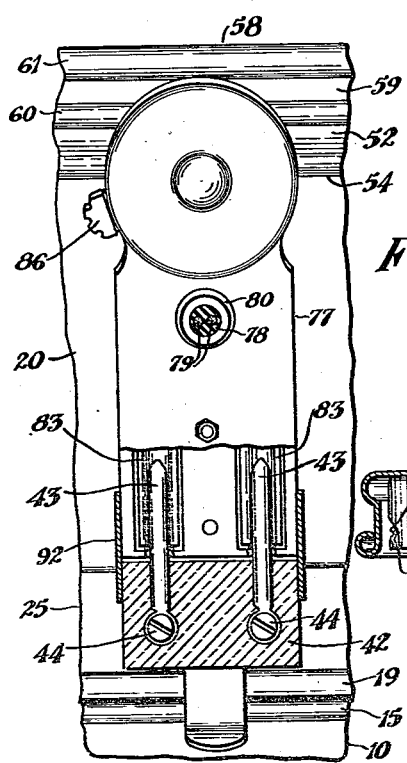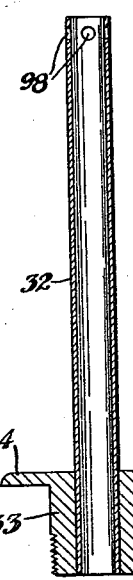

Patented Feb. 12, 1935

1,990,508

UNITED STATES PATENT OFFICE 1,990,508

AUTOMATIC ELECTRIC DRIP COFFEE MAKER

Albert C. Wilcox, Massillon, Ohio, assignor to The Enterprise Aluminum Company, Massillon, Ohio, a corporation of Ohio Application September 19, 1933, Serial No. 690,083

10 Claims. (Cl. 219—44)

This invention relates to drip coffeepots and especially to an automatically operating electric appliance for making drip coffee.

The invention contemplates generally the provision of a drip coffee maker in which cold water may be placed in a water reservoir or receptacle wherein it is heated by electric means, the water being automatically discharged from the reservoir, when it reaches the boiling point, through a basket containing ground coffee, from which the coffee beverage drips into a pot, the electric heating means being automatically rendered inoperative as the water in the reservoir reaches the boiling point.

A drip coffee maker of this general type is disclosed in my copending application Serial No. 623,560, filed July 20, 1932 and the object of the present improvement is to make certain refinements and improvements over the same.

One object of the improvement is to provide a primary cover or lid fixedly connected to the upper end portion of the water reservoir or receptacle and having a central opening provided with an upstanding flange or neck surrounded by an annular groove in which is located a gasket of rubber or the like, a secondary lid or cover being provided with a depending flange adapted to encircle said neck, there being means for clamping the same upon the neck with the depending edge of the secondary cover tightly engaging the rubber gasket to provide a steam-tight joint.

Another object is to simplify and improve the connection of the electrical switch plug to the drip coffee maker whereby the steam generated in the water reservoir is conveyed directly to the interior of the switch plug housing.

A further object is to so construct the electric switch plug and the associated parts that the water in the water reservoir will not be caused to prematurely siphon therefrom into the coffee basket.

Another object is to provide the secondary lid with an internal auxiliary shell having bayonet slots for engagement with studs upon the neck of the primary lid for clamping the secondary lid in position thereon.

A still further object of the improvement is to provide a heating element compartment shell adapted to be detachably connected to the lower end portion of the water reservoir by means of a nut engaging the threaded stud upon the stand tube, this shell together with the bottom of the water reservoir forming a compartment to house the heating element.

The above, together with other objects which will be later pointed out or which will be obvious from the drawings and the following description, may be attained by constructing the improved drip coffee maker in the manner illustrated in the accompanying drawings, in which Figure 1 is a vertical sectional view through the improved automatic electric drip coffee maker embodying the invention;

Fig. 2, an enlarged fragmentary sectional elevation of the automatic switch plug showing the connection of the same to the water reservoir;

Fig. 3, a fragmentary elevation of a portion of the water reservoir and automatic switch plug with parts broken in section for the purpose of illustration, taken substantially on the line 3—3, Fig. 1;

Fig. 4, a detached vertical sectional view of the stand tube and the stud for connecting the same to the water reservoir;

Fig. 5, a similar view of the telescope tube which cooperates with the stand tube to automatically siphon the boiling water from the water reservoir through the coffee basket; and Fig. 6, a diametric sectional view through the secondary lid or cover.

Similar numerals refer to similar parts throughout the several views of the drawings.

The coffee beverage container or pot is indicated generally at 10 and may be provided with the usual pouring spout 11 and handle 12 connected to the pot as by the bracket or support 13 which may be attached in any suitable manner as by the rivets 14. The upper open end of the pot 10 may be provided with a conventional rim bead 15.

The coffee basket 16 is provided with the perforated bottom wall 17, the upper end thereof being shouldered as at 18 and terminating in the rim bead 19 adapted to rest upon the bead 15 of the pot 10 when assembled for operation as shown in Fig. 1.

The water reservoir or receptacle 20, the same as the other parts of the improved drip coffee maker, may be formed of sheet metal, preferably aluminum, the lower end portion of which may be provided with the annular shouldered portion 21 and then reduced as at 22, the bottom wall 23 having a central opening 24 therein.

The heating element compartment shell indicated generally at 25 is provided with an upper open end adapted to slip over the shouldered portion 21 of the water reservoir and to butt against the peripheral shoulder 26 thereon. This shell 25 is shouldered at 27 to rest upon the bead 19 and again at 28 to fit within the shouldered portion 18 of the coffee basket, the lower portion of the shell being reduced as at 29 and having the central socket or recess 30 formed therein provided with the concentric opening 31 adapted to be aligned with the opening 24 in the bottom of the water reservoir.

The stand tube 32 has a flanged stub 33 fixed upon the lower end portion thereof and adapted to be extended through the central openings 24 and 31 in the bottoms of the water reservoir and shell 25 respectively, the annular flange 34 at the upper end of said stud being arranged to rest upon the upper surface of the bottom wall 23 of the water reservoir while the threaded lower end 35 of the stud is adapted to project through the opening 31 and into the recess 30.

In assembling these parts, the heating element 36, which is provided with a central opening 37, is placed upon the shoulder or raised portion 38 of the shell 25 with the central opening 37 thereof aligned with the central opening 31 of the shell 25. The electric leads or conductors 39 are then fastened to the binding posts 40 on the heating element 36 by means of the nuts 41.

The terminal block 42 is formed of suitable insulation material such as bakelite or the like and has imbedded therein the lower end portions of the plug-in points 43, which are connected, as by the screws 44, with the binding posts 45. This terminal block is placed in position against the side of the shell 25 with the binding posts 45 thereof extending through the openings 46 in the shell and the insulating washers 47 are then placed upon the binding posts 45 and the nuts 48 are placed upon the binding posts and tightened, fastening the terminal block to the shell.

The electric leads 39 are then placed upon the binding posts 45 and are clamped against the nuts 48 by means of the lock nuts 49 and the heating element compartment shell is ready for assembly to the water reservoir.

The shell 25 is then slipped over the shoulder 21 and the stand tube 32, carrying the flanged stud 33 is passed through the opening 24 in the bottom wall of the water reservoir and through the central opening 37 of the heating element, the threaded lower end portion of said stud extending through the central opening 31 in the shell 25 and into the recess 30 and the lock nut 50 is screwed onto the threaded lower end of the stud 33, drawing the shell 25 upward against the water reservoir to the position shown in Fig. 1, apertures 51 being provided in the nut 50 to accommodate a spanner wrench for tightening the nut and tightly drawing the parts together.

The primary lid or cover 52 is fixed to the upper end of the water reservoir and may be connected thereto as by means of a machine such as a double beading machine or the like which rolls the beads 53 and 54 upon the reservoir and primary lid respectively, tightly together as shown in the drawings. The primary lid 52 is provided with the central upright neck 55 surrounded by the annular recess 56 to accommodate a gasket 57 of rubber or the like.

The secondary or removable lid indicated generally at 58 is adapted to cover the neck 55 of the primary lid and to fit tightly upon the gasket 57 and for this purpose has the depending annular flange 59 which may be beaded at its lower edge as shown at 60, providing a suitable surface for clamping contact with the gasket. This secondary lid may also be provided at its upper end with the peripheral rim or bead 61 which provides a suitable finger grip for placing the secondary lid in position or removing it.

An auxiliary shell comprising a top wall 62, firmly attached to the top wall of the secondary lid 58, and a depending annular flange 63, spaced from the flange 59, is located within the secondary lid. Inclined bayonet slots 64, having their lower ends opening through the lower edge of the flange 63 as shown at 65, are formed in the depending annular flange 63 of the shell and are adapted to cooperate with the studs 66 carried by the neck 55, whereby the secondary lid may be clamped tightly upon the gasket 57 and temporarily locked in the clamped position, in the manner shown in Fig. 1.

A bleeder port is provided for permitting the escape of steam from the reservoir to operate an automatic switch plug for cutting off the current to the heating element when the water in the reservoir reaches the boiling point. This bleeder port may be located in any desired portion of the water reservoir, being preferably located through the primary lid or cover thereof, as illustrated in the drawings.

For this purpose the primary lid 52 may be shouldered as at 67 and provided with an opening 68 to receive the reduced threaded upper end 69 of the lower member 70 of the bleeder port housing which may be provided with a ball seat 71 and an inlet port 72. This bleeder port may be operated without a check valve but if desired, a check ball 73 as shown in Fig. 2 may be arranged to normally seat in the ball seat 71.

The cap 74 is internally threaded and screwed down upon the threaded neck 69, clamping the two parts of the bleeder housing tightly together upon the shouldered portion of the primary lid. A ball nose steam nozzle 75 is formed integrally with the cap 74 and the bleeder port 76 is formed therein.

The automatic electric switch is mounted within an insulation housing indicated generally at 77 and has connected thereto a flexible cord 78 of usual and ordinary construction enclosing a pair of electric wires 79 adapted to be connected to a base receptacle in the usual manner.

A boss 80 may be formed upon the insulation housing as a support for the spring 81 through which the cord 78 is located, an insulation bushing 82 being preferably located around the cord at the outer end of the spring. The wires 79 are adapted to be electrically connected to the electric contact clips 83 by means of a switch mechanism indicated generally at 84 normally held in open position as by a spring 85 and adapted to be manually moved to closed position as by the switch key or knob 86.

A bimetal strip, comprising two metals of different coefficients of expansion, indicated generally at 87, is fixed at one end within the housing as indicated at 88, the free end portion thereof having an opening 89 therein adapted to receive the ball knob 90 upon the arm 91 carried by the switch mechanism 84, this ball knob being received within the opening 89 of the bimetal strip as shown in Fig. 2, when the switch is in the closed position.

The contact clips 83 are adapted to receive the plug-in points 43, upon the terminal block, as best shown in Fig. 3, and a guard 92 may be provided upon the terminal block for guiding the switch plug as well as guarding the plug-in points when the switch plug is placed upon or removed from the terminal block.

The housing 77 may be provided with a metal cover 93 enclosing the bimetal strip 87 and having a ball cavity 95 arranged to receive the ball nose steam nozzle 75, a bleeder port 96 being formed therein to communicate with the bleeder port 76 in the nozzle. A steam outlet 97 may be provided in the cover plate 93 to permit escape of vapors and moisture from the switch plug.

The stand tube 32 is provided at its upper end with apertures 98. The telescope tube 99 is of larger diameter than the stand tube and the upper end thereof is closed as by a cap 100. This telescope tube is adapted to normally surround the stand tube as shown in Fig. 1, the cap thereof resting upon the upper end of the stand tube whereby a water passage 101 is formed between the two tubes. The lower end of the telescope tube is spaced above the top of the flange 34 on the stud 33, thus providing a water intake space 102. A spreader plate 103, provided with a few small perforations, as indicated at 104, has an upturned peripheral rim flange 105 adapted to snugly fit upon the reduced portion 29 of the shell 25 as shown in Fig. 1.

In the operation of the improved drip coffeepot to make drip coffee, the proper amount of ground coffee is placed in the coffee basket 17 and the coffee basket placed upon the coffee beverage pot 10, the bead 19 thereof resting upon the bead 15 of the pot as shown in Fig. 1. The water reservoir or container 20 is then placed upon the coffee basket, the shoulder 27 of the shell 25 resting upon the bead 19 of the coffee basket.

The secondary lid 58 is removed from the reservoir and the proper amount of water, the level of which should not be above the apertures 98 of the stand tube, is placed in the reservoir 20. The secondary lid 58 is then placed upon the reservoir and given a slight turn, causing the inclined slots 64 of the auxiliary shell, cooperating with the studs 66 on the neck of the primary lid, to force the secondary lid tightly down upon the rubber gasket 57, producing a steam and water tight seal at this point. The inclined slots 64 are of sufficient length and inclination to permit taking up of any wear upon the gasket 57 so that the secondary lid may always be tightly sealed upon the primary lid.

The electric switch plug is then attached to the terminal block as shown in Figs. 1 and 3 with the ball cavity 95 receiving the ball nose steam nozzle 75. The switch mechanism is moved to the closed position, the ball knob 90 being engaged in the aperture 89 of the bimetal strip, holding the switch in closed position against the pressure of the spring 85. The circuit is thus closed to the heating element 36, heating the water in the reservoir 20.

In a few minutes after the current has been turned on the water is heated sufficiently to generate a steam pressure within the reservoir 20 and this pressure being exerted upon the surface of the water in the reservoir causes the water to siphon up through the water passage 101 and through the apertures 98 and then down through the stand tube 32 to the spreader plate 103 which carries a sufficient number of apertures to distribute the water over the surface of the ground coffee in the coffee basket. The water passes down through the ground coffee and drips through the perforated bottom of the coffee basket into the pot 10. This continues until all of the water has been siphoned out of the water reservoir and passed through the coffee backet to the pot 10.

While this process is being carried out the excess steam escapes through the inlet port 72 to the ball compartment 71 and thence through the bleeder port 76 of the nozzle 75 and through the bleeder port 96 to the interior of the switch housing contacting with the upper or free end portion of the bimetal strip 87, rapidly heating the same by direct contact of the steam therewith and causing the bimetal strip to bend outward or toward the plate 93, releasing the ball knob 90 from engagement with the aperture 89, permitting the spring 85 to throw the switch mechanism 84 to open position, thus cutting off the current to the electric heating element 36. The steam escapes from the interior of the switch housing through the outlet port 97.

It should be noted that when a free passage of steam is permitted from the water reservoir to the switch housing, by eliminating the check ball in the compartment 70, that as the steam pressure is generated it is given relief through the open bleeder port so that there is no premature siphoning of the water, and when the pressure is great enough to siphon the water the steam is live enough to operate the bimetal strip on the instant of contact so as to instantly open the switch. Thus it is seen that the switch will not operate until the water is boiling and cannot be kept from operating when the water has reached the boiling point unless the device is mechanically defective. The relief of steam through the bleeder port is one safety, and the constant lowering of the water level in the reservoir 20 is another, and after the water has all been siphoned from the container, the stand tube itself becomes a safety valve.

I claim:

1. A drip coffee maker including a water receptacle, a primary lid fixed to the upper end of said water receptacle and provided with an inlet opening, a secondary lid adapted to form a steam tight seal over said opening, a coffee basket beneath said water receptacle, means for heating the water in the water receptacle, and means operated by steam pressure in the water receptacle for discharging the water from the water receptacle through the coffee basket.

2. A drip coffee maker including a water receptacle, a primary lid fixed to the upper end of said water receptacle and having an inlet opening surrounded by an upright neck, a secondary lid, means for clamping the secondary lid over said neck to form a steam tight seal, a coffee basket beneath said water receptacle, means for heating the water in the water receptacle, and means operated by steam pressure in the water receptacle for discharging the water from the water receptacle through the coffee basket.

3. A drip coffee maker including a water receptacle, a primary lid fixed to the upper end of said water receptacle and having an inlet opening surrounding by an upright neck, a resilient gasket surrounding said neck, a secondary lid having a depending flange adapted to surround the neck, means for clamping said flange upon said gasket to form a steam tight seal, a coffee basket beneath said water receptacle, means for heating the water in the water receptacle, and means operated by steam pressure in the water receptacle for discharging the water from the water receptacle through the coffee basket.

4. A drip coffee maker including a water receptacle, a primary lid fixed to the upper end of said water receptacle and having an inlet opening surrounded by an upright neck, an annular recess surrounding said neck, a resilient gasket in said recess, a secondary lid having a depending flange adapted to surround the neck, means for clamping said flange upon said gasket to form a steam tight seal, a coffee basket beneath the water receptacle, means for heating the water in the water receptacle, and means operated by steam pressure in the water receptacle for discharging the water from the water receptacle through the coffee basket.

5. A drip coffee maker including a water receptacle, a primary lid fixed to the upper end of said water receptacle and having an inlet opening surrounded by a neck, a secondary lid, an inner shell within said secondary lid having inclined slots therein, studs in said neck arranged to cooperate with said inclined slots to clamp the secondary lid tightly upon the primary lid to form a steam tight seal, a coffee basket beneath the water receptacle, means for heating the water in the water receptacle, and means operated by steam pressure in the water receptacle for discharging the water from the water receptacle through the coffee basket.

6. A drip coffee maker including a water receptacle, a primary lid fixed to the upper end of said water receptacle and having an inlet opening surrounded by an upright neck, a resilient gasket surrounding said neck, a secondary lid having a depending flange, an inner shell within said secondary lid having inclined slots therein, studs in said neck arranged to cooperate with said inclined slots to clamp said depending flange upon said gasket to form a steam tight seal, a coffee basket beneath the water receptacle, means for heating the water in the water receptacle, and means operated by steam pressure in the water receptacle for discharging the water from the water receptacle through the coffee basket.

7. A drip coffee maker including a water receptacle, a coffee basket beneath said water receptacle, an electric heating element for heating the water in the water receptacle, a switch plug containing a thermally operated switch controlling the heating element, a steam nozzle upon the water receptacle communicating with the interior of the switch plug, and means operated by steam pressure in the water receptacle for discharging water from the water receptacle through the coffee basket.

8. A drip coffee maker including a water receptacle, a coffee basket beneath said water receptacle, an electric heating element for heating the water in the water receptacle, a switch plug containing a thermally operated switch controlling the heating element and connected to one side of the water receptacle, said switch plug having a bleeder port communicating with the interior thereof, a steam nozzle upon the water receptacle adapted to communicate with said bleeder port, and means operated by steam pressure in the water receptacle for discharging water from the water receptacle through the coffee basket.

9. A drip coffee maker including a water receptacle, a coffee basket beneath said water receptacle, an electric heating element for heating the water in the water receptacle, a switch plug containing a thermally operated switch for controlling the heating element and adapted to be mounted at one side of the water receptacle, an upright bleeder port compartment at the upper end for the water receptacle, a substantially horizontal steam nozzle communicating with said bleeder port and adapted to communicate with the interior of the switch plug, and means operated by steam pressure in the water receptacle for discharging the water from the water receptacle through the coffee basket.

10. A drip coffee maker including a water receptacle, a coffee basket beneath said water receptacle, an electric heating element for heating the water in the water receptacle, a switch plug containing a thermally operated switch for controlling the heating element and adapted to be mounted at one side of the water receptacle, an upright bleeder port compartment at the upper end of the water receptacle, a check ball in said bleeder port compartment, a substantially horizontal steam nozzle communicating with said bleeder port and adapted to communicate with the interior of the switch plug, and means operated by steam pressure in the water receptacle for discharging the water from the water receptacle through the coffee basket.

ALBERT C. WILCOX.